(12) United States Patent
Willden

(10) Patent No.: US 6,752,501 B2
(45) Date of Patent: Jun. 22, 2004

(54) LENSLESS LASER FOCUSING DEVICE

(76) Inventor: Dee E. Willden, 1489 W. 2nd Ave., Port Washington, WI (US) 53074

( * ) Notice: Subject to any disclaimer, the term of this patent is extended or adjusted under 35 U.S.C. 154(b) by 0 days.

(21) Appl. No.: 10/126,907

(22) Filed: Apr. 19, 2002

(65) Prior Publication Data

US 2002/0154421 A1 Oct. 24, 2002

Related U.S. Application Data

(60) Provisional application No. 60/285,836, filed on Apr. 23, 2001.

(51) Int. Cl.[7] ............................................... G02B 5/08
(52) U.S. Cl. ............................................ 359/838; 385/31
(58) Field of Search ........................... 385/31, 32, 33, 385/34; 354/838

(56) References Cited

U.S. PATENT DOCUMENTS

| | | | |
|---|---|---|---|
| 3,414,354 A | 12/1968 | Siegler, Jr. ................ 356/75 |
| 3,775,609 A | 11/1973 | Dank ..................... 240/41.35 |
| 3,826,561 A | 7/1974 | Gregg ....................... 359/729 |
| 3,981,705 A | 9/1976 | Jaeger et al. ................... 65/2 |
| 4,362,361 A | 12/1982 | Campbell et al. ........... 359/629 |
| 4,744,615 A | 5/1988 | Fan et al. .................. 385/146 |
| 5,016,995 A | 5/1991 | Pullen ....................... 359/366 |
| 5,211,473 A | 5/1993 | Gordin et al. ............. 362/297 |
| 5,276,693 A | * 1/1994 | Long et al. .................... 372/6 |
| 5,303,084 A | 4/1994 | Pflibsen et al. ............. 359/503 |
| 5,343,330 A | 8/1994 | Hoffman et al. ............ 359/708 |
| 5,343,376 A | * 8/1994 | Huang ........................ 362/259 |
| 5,369,511 A | 11/1994 | Amos ......................... 359/15 |
| 5,442,787 A | 8/1995 | Steiner ....................... 89/629 |
| 5,495,363 A | 2/1996 | Gast ........................... 359/351 |
| 5,700,078 A | 12/1997 | Fohl et al. .................... 362/32 |
| 5,731,900 A | 3/1998 | Milner ....................... 359/627 |
| 5,756,962 A | 5/1998 | James et al. ........... 219/121.75 |
| 5,857,770 A | 1/1999 | Fohl et al. .................. 362/511 |
| 6,147,761 A | 11/2000 | Walowit et al. ............. 356/425 |

FOREIGN PATENT DOCUMENTS

| | | |
|---|---|---|
| DE | 40 17 286 | 12/1991 |
| EP | 0 771 607 | 5/1997 |
| GB | 2 044 948 | 10/1980 |

* cited by examiner

*Primary Examiner*—Drew A. Dunn
(74) *Attorney, Agent, or Firm*—Andrus, Sceales, Starke & Sawall, LLP

(57) ABSTRACT

A lensless focusing device for receiving an unfocused laser beam and discharging a focused laser beam. The focusing device includes a solid body having an open interior defined by a conical inner wall extending from an inlet opening to a discharge opening. The conical inner wall is a polished or reflective surface that directs the input laser beam toward the discharge opening. The solid body can include a heating element to raise the temperature of the solid body relative to ambient.

16 Claims, 5 Drawing Sheets

LENSLESS LASER FOCUSING DEVICE

CROSS-REFERENCE TO RELATED APPLICATION

The present application is based on and claims priority to U.S. Provisional Patent Application Serial No. 60/285,836, filed on Apr. 23, 2001, the disclosure of which is incorporated herein by reference.

BACKGROUND OF THE INVENTION

Since the invention of lasers, optics made of glass, quartz, zinc selenide, germanium and numerous other focusing mediums shaped into the form of lenses have been used to concentrate the raw, unfocused laser beam onto targets of many types. Anti-reflective coatings have been developed and applied to the expensive optics to permit transmission of the laser beam through the lens medium. However, at extremely high powers, the unfocused laser beam rapidly degenerates the lens material.

A significant problem that occurs during the use of high-powered laser systems is the distortion of the laser beam and/or damage to the lens material. Since many of the advanced lens optics can cost hundreds or even thousands of dollars, lens damage creates a significant problem. Further, the removal and replacement of a damaged lens can result in large amounts of time lost during the actual replacement procedure.

Since current lenses are made from light-transmitting materials, environmental factors can have a large effect on the functionality of the lens. For example, humidity can create damage to the lens optics due to the condensation of water on the lens surface. Further, use of lens optics in warm environments requires the use of cooling systems.

In some applications of lasers including lenses made from light-transmitting materials, the laser is used in a harsh operating environment, such as a desert. In this type of operating environment, small particles of sand or other debris can scratch or damage the optics, thereby limiting the use of such devices.

In addition to the use of optics, alternate focusing devices include the use of mirrored focusing technology. Although mirrored focusing technology addresses some of the problems created by the currently available optics, mirrored focusing devices do not provide the required performance of costly optics. Therefore, a need clearly exists for technology to replace both optical focusing materials for lenses and mirrored focusing technology. The use of such improved technology would allow focusing devices to be used in many different operating environments, such as space where optics can be easily degraded by cosmic radiation and solar wind. Therefore, it is an object of the present invention to provide a laser focusing device that does not utilize lens optics. Further, it is an object of the present invention to provide a focusing device that provides the required focusing while being able to be used in a harsh operating environment. A still further object of the present invention is to provide a focusing device that can be manufactured at a relatively low cost and easily replaced upon damage.

SUMMARY OF THE INVENTION

The present invention is a lensless focusing device for focusing an input, raw laser beam to create a focused, useful output laser beam. The focusing device of the present invention eliminates expensive and fragile optics while focusing an input laser beam to a usable, focused output.

The focusing device of the present invention utilizes a solid body of preferably metallic material such as aluminum or stainless steel. The solid body extends from an inlet end to a discharge end.

The solid body includes a generally open interior that extends from an inlet opening formed at the inlet end of the solid body to a discharge opening formed at the discharge end of the solid body. The open interior is defined by a conical inner wall formed in the solid body that extends from the inlet opening to the discharge opening.

The inlet opening formed in the solid body defines an entry area that receives the input laser beam. Preferably, the entry area of the opening is greater than the cross-sectional area of the input laser beam such that the entire input laser beam can be received through the inlet opening.

As the individual light beams of the input laser beam enter the inlet opening, the light beams contact the conical inner wall and are reflected toward the discharge opening. Specifically, the inner wall of the solid body is a polished surface that reflects the light beams toward the discharge opening. The polished inner surface can be formed through many machining or application processes as long as the polished surface reflects the inlet light beams toward the discharge opening.

The discharge opening formed at the discharge end of the solid body has a discharge area that is less than the cross-sectional area of the input laser beam. Therefore, the discharge opening focuses the individual light beams of the input laser beam as required.

In an alternate embodiment of the invention, a heating element is positioned in contact with the solid body of the focusing device. The heating element is operable to elevate the temperature of the solid body during operation. The elevated temperature of the solid body increases the reflectivity of the conical inner wall to increase the efficiency of the focusing device. In the most preferred embodiment of the invention, the heating element is positioned within an opening formed in the solid body such that the heat generated by the heating element can be effectively transferred to the solid body.

In yet another alternate embodiment of the invention, the solid body is formed having a series of steps formed along the conical inner wall extending between the inlet opening and the discharge opening. Each of the steps formed along the conical inner wall decreases the diameter of the open interior as the steps proceed from the inlet opening to the discharge opening. The conical steps formed along the conical inner wall each include a polished surface such that the steps direct the light beams of the inlet laser beam toward the discharge opening.

In the most preferred embodiment of the invention, the discharge opening has either an oval or circular cross-section shape. However, it is contemplated that various other shapes for the discharge opening can be used depending upon the preferred shape of the focused laser beam.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
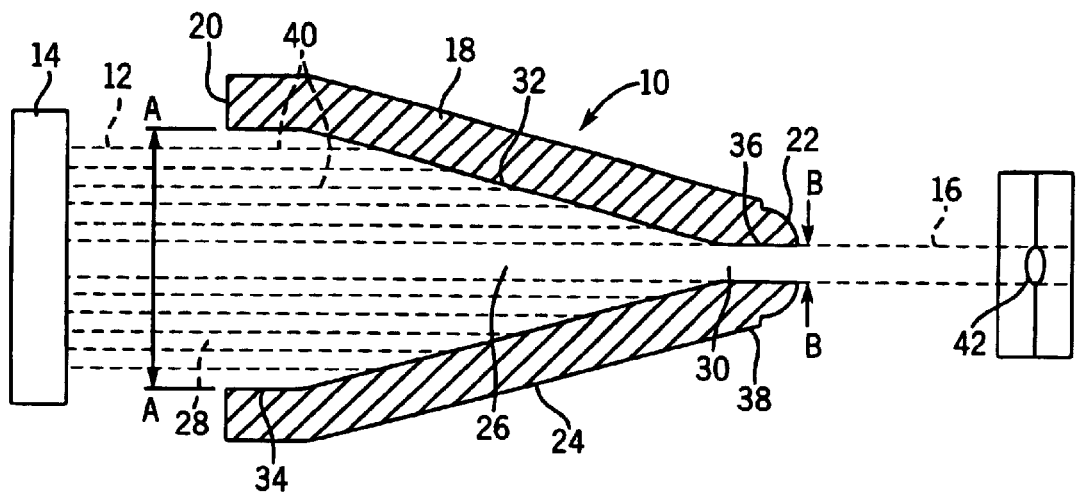
FIG. 1 is a section view illustrating the laser focusing device of the present invention.

FIG. 1 illustrates a lensless focusing device 10 of the present invention. The focusing device 10 is shown as being utilized to focus a raw, unfocused input laser beam 12 from a source 14 to a focused laser beam 16. The focused output laser beam 16 can be used for many different applications, as will be described in detail below.

In the embodiment of the invention illustrated in FIG. 1, the focusing device 10 includes a solid body 18 that extends from an inlet end 20 to a discharge end 22. In the embodiment of the invention illustrated in FIG. 1, the solid body 18 is shown as having a conical outer surface 24, although other shapes for the outer surface of the solid body 18 are contemplated as being within the scope of the present invention.

In the preferred embodiment of the invention, the solid body 18 is formed from a metallic material, such as aluminum or stainless steel. However, it is contemplated that other materials could be used to form the solid body 18 while falling within the scope of the present invention.

As illustrated in FIG. 1, the solid body 18 defines a generally open interior 26. The open interior 26 is defined by the solid body 18 and extends from an inlet opening 28 to a discharge opening 30. Specifically, the open interior 26 is defined by a conical inner wall 32 that decreases in diameter from the inlet opening 28 to the discharge opening 30. In the embodiment of the invention illustrated in FIG. 1, the conical inner wall 32 is connected to an inlet wall 34 having a constant diameter and an outlet wall 36 formed in a tip section 38. The outlet wall 36 has a constant diameter through the tip section 38.

As illustrated in FIG. 1, the inlet opening 28 is circular and has a diameter A—A to define an entry area. In the preferred embodiment of the invention, the input laser beam 12 has a circular cross-section having a diameter less than the diameter A—A of the inlet opening 28. Thus, the entire input laser beam 12 enters into the inlet opening 28, as illustrated.

Once the input laser beam 12 enters into the inlet opening 28, the individual light beams 40 contact the conical inner wall 32. In the preferred embodiment of the invention, the conical inner wall 32 includes a polished surface such that the conical inner wall 32 reflects the individual light beams 40. The conical shape of the inner wall 32 directs the reflected light beams 40 toward the discharge opening 30.

As discussed previously, the solid body 18 is formed from a metallic material, such as aluminum or stainless steel. Thus, the conical inner wall 32 can be highly polished to reflect the individual light beams 40. Alternatively, the solid body 18 can be formed from other materials and a highly reflective or polished surface can be formed along the conical inner wall 32. For example, a reflective or polished coating can be applied to the solid body 18 along the conical inner wall to reflect the individual light beams 40 as desired.

As illustrated in FIG. 1, the individual light beams 40 are directed toward the discharge opening 30. The discharge opening 30 has a diameter B—B that is less than the diameter A—A of the inlet opening 28. Further, the diameter B—B is significantly less than the width of the input laser beam 12. Thus, the output laser beam from the discharge opening 30 is the focused laser beam 16. As illustrated in FIG. 1, the focused laser beam 16 defines an oval pattern 42 which is determined by the shape of the outlet wall 36.

Figure 7:
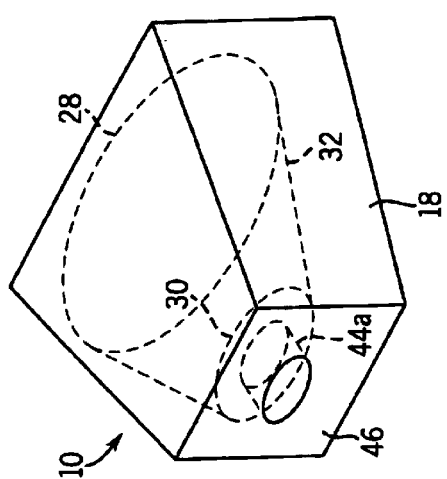
FIG. 7 is a first embodiment of the discharge end of the focusing device.
Figure 8:
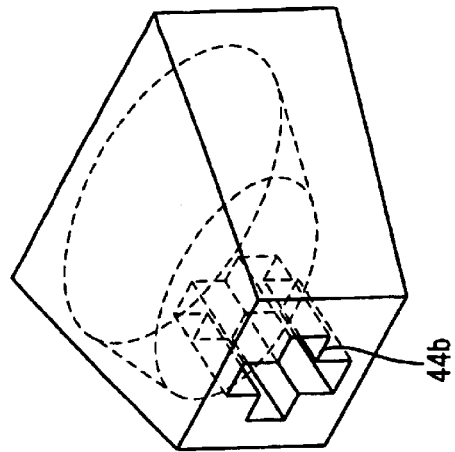
FIG. 8 is a second embodiment of the discharge end of the focusing device.
Figure 9:
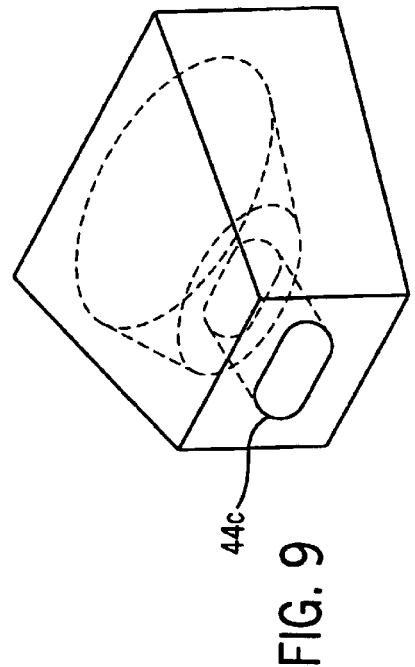
FIG. 9 is a third embodiment of the discharge end of the focusing device.
Figure 10:
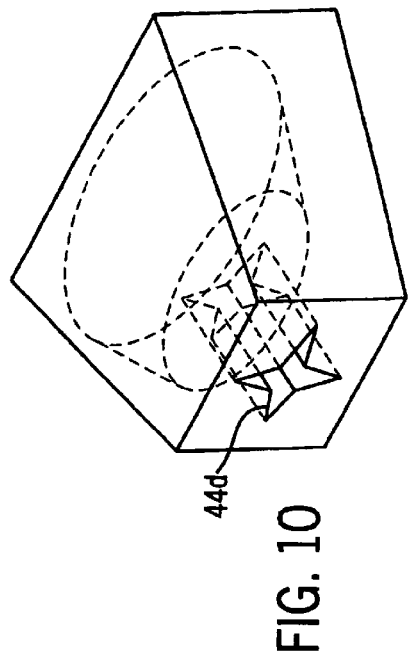
FIG. 10 is a fourth embodiment of the discharge end of the focusing device.

Referring now to FIGS. 7–10, thereshown are several alternate embodiments of the beam shaping section 44 extending from the discharge opening 30 to the outer tip 46. In FIG. 7, the beam shaping section 44a is shown as an oval. FIG. 8 shows the beam shaping section 44b in the shape of a cross, while FIGS. 9 and 10 illustrate other beam shaping sections 44c and 44d. Although the four embodiments illustrated in FIGS. 7–10 illustrate several shapes for the output laser beam, it is contemplated by the inventor that various shapes can be utilized while operating within the scope of the present invention.

As illustrated in FIG. 7, the solid body 18 is shown having a different configuration than the solid body shown in FIG. 1. However, the solid body 18 includes the inlet opening 28 and the conical inner wall 32 extending to the discharge opening 30. The shape of the solid body 18 does not affect the operation of the focusing device 10 since the open interior defined by the inner wall 32 remains the same.

Figure 2:
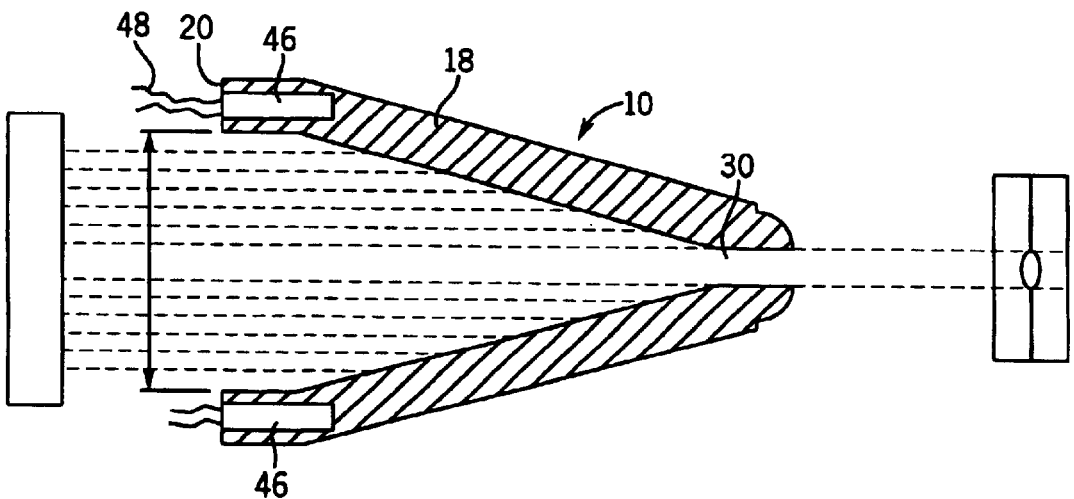
FIG. 2 is a section view similar to FIG. 1 illustrating the focusing device of the present invention incorporating a heating element.

Referring now to FIG. 2, thereshown is another alternate embodiment of the focusing device 10 of the present invention. In the embodiment of the invention illustrated in FIG. 2, the solid body 18 includes a heating element 46 positioned in contact with the solid body 18. Specifically, the heating element 46 extends into the solid body 18 from the inlet end 20. The heating element 46 includes a plurality of wires 48 that allow the heating element to be connected to a supply of electricity. The heating element 46 is operable to transfer heat to the metallic material forming the solid body 18. The elevated temperature of the solid body 18 increases the output of the focused laser beam 16, as illustrated in FIG. 4.

Figure 4:
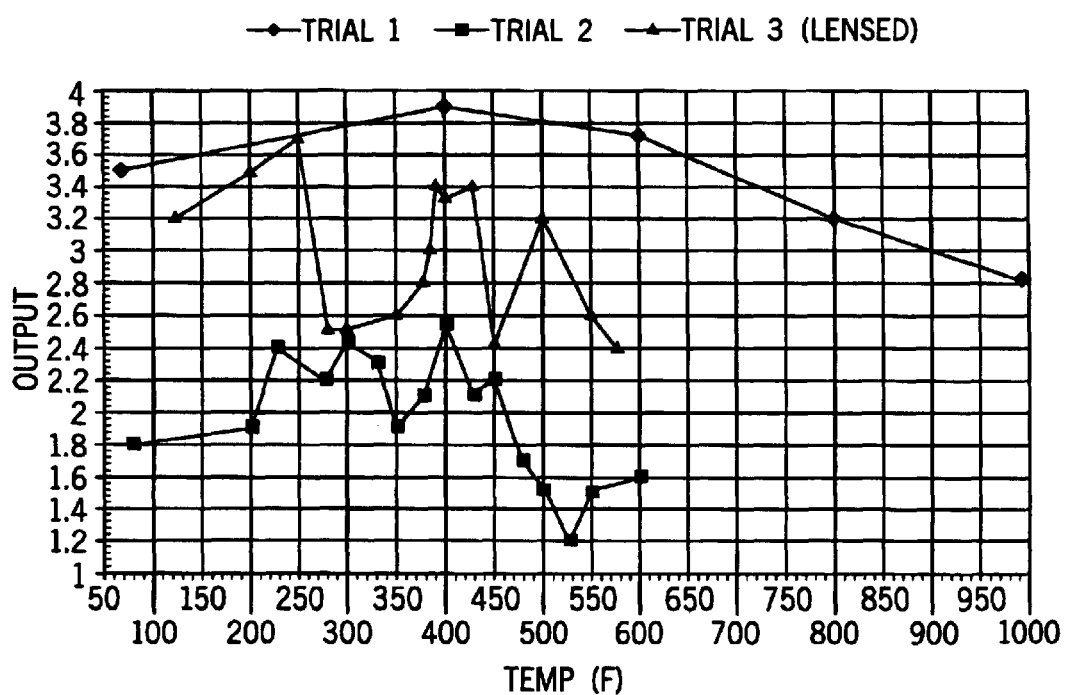
FIG. 4 is a graph illustrating the output of the focusing device at various operating temperatures.

As FIG. 4 illustrates, the power of the focused laser beam 16 increases at temperatures above ambient for each of the trials conducted. Thermal conditioning of the focusing device of the present invention by using the heating element 46 and other thermal sources not described has the effect of increasing the orbits of the atoms in the molecular surfaces, whereby the expanded heated molecules of the conical inner wall 32 are made more reflective. In the present invention, the temperature of 200° F. for the solid body 18 has been found to be a preferred operating temperature.

Figure 3:
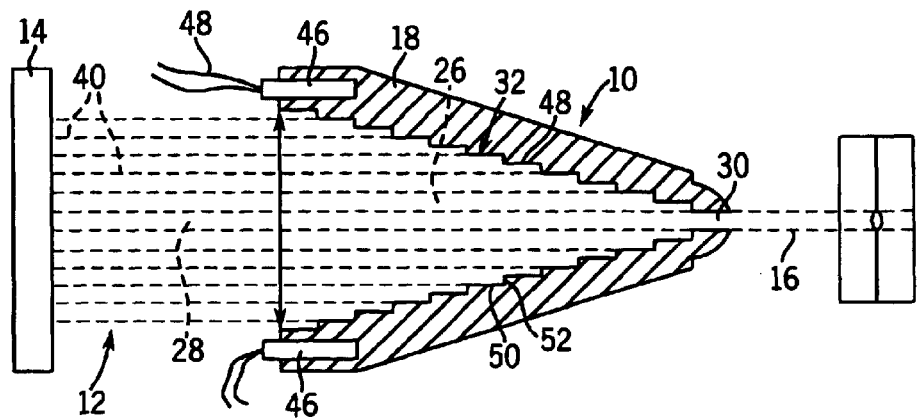
FIG. 3 is a section view illustrating a second embodiment of the laser focusing device of the present invention including a heating device.

Referring now to FIG. 3, thereshown is yet another alternate embodiment of the focusing device 10 of the present invention. In the embodiment illustrated in FIG. 3, the solid body 18 includes a plurality of individual steps 48 formed along the conical inner wall 32. The plurality of individual steps 48 decrease the diameter of the open interior 26 from the inlet opening 28 to the discharge opening 30. The plurality of individual steps 48 each include a polished inner face surface 50, as well as a step surface 52. The polished inner face surface 50 and step surface 52 aid in reflecting the individual light beams 40 toward the discharge opening 30.

In the embodiment illustrated in FIG. 3, heating elements 46 are utilized, although it is contemplated by the inventor that the heating elements 46 could be removed while operating within the scope of the present invention. As with the embodiments illustrated in FIGS. 1 and 2, in the preferred embodiment of the invention, the solid body 18 is formed from a metallic material, such as aluminum or stainless steel.

In the preferred embodiment of the invention, the inlet laser beam 12 was a 10.6 micron $CO_2$ laser. The focused laser beam 16 was a beam of less than 20- times the incoming laser beam. Although the invention is contemplated as being utilized with a $CO_2$ laser, the present invention should not be restricted to such a laser.

Figure 6:
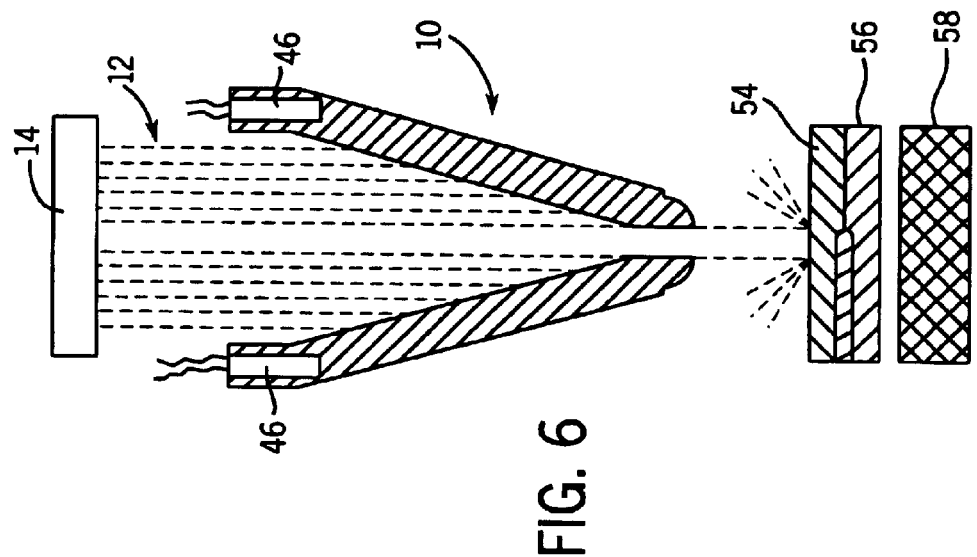
FIG. 6 is a view similar to FIG. 5 illustrating the use of the focusing device having a heating element to bond a pair of plastic sheets.
Figure 5:
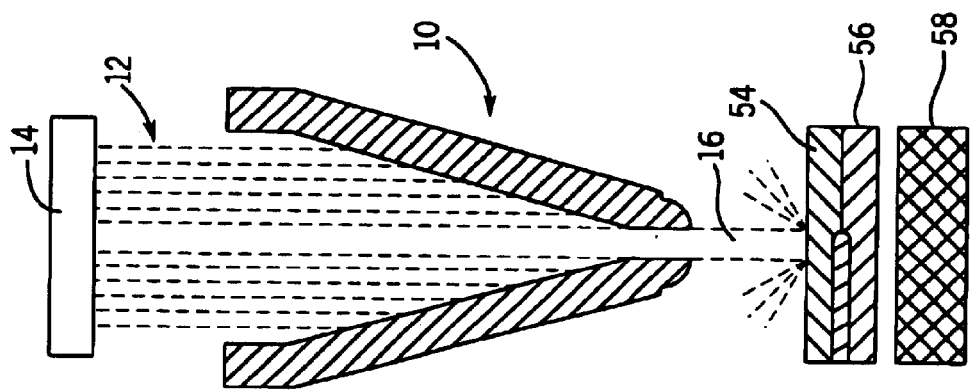
FIG. 5 is a view illustrating the use of the focusing device of the present invention to bond a pair of plastic sheets.

Referring now to FIGS. 5 and 6, thereshown is a use of the focusing device 10 as a means to bond two sheets of thin film 54 and 56. In each case, the focused laser beam 16 bonds the two sheets of polymeric film 54, 56 above a heated platen 58. In FIG. 5, the focusing device 10 does not include heating elements, while FIG. 6 illustrates a focusing device including the heating elements 46. It is contemplated by the inventors that the film 54, 56 could be either immobilized or mobilized while operating within the scope of the present invention.

As described previously, the polished nature of the inner wall 32 allows the focusing device 10 of the present invention to direct the individual light beams toward the discharge opening 30. In accordance with the present invention, multiple techniques of creating the highly polished surface along the inner wall 32 are contemplated. For example, machining techniques, reflective coatings which are sputtered of vacuum deposited or any other method of forming the reflective or polished surface are contemplated as being within the scope of the present invention.

Figure 11:
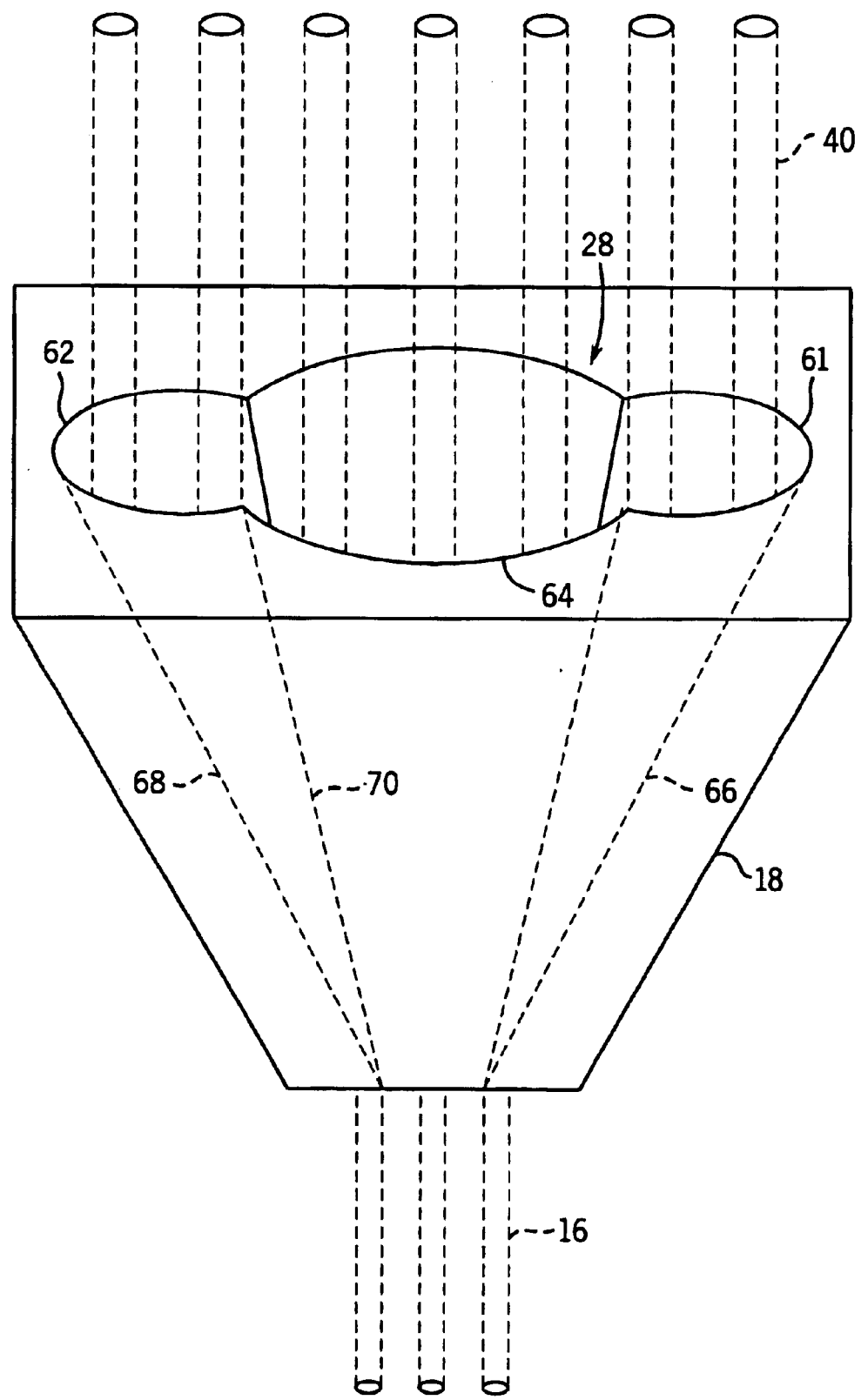
FIG. 11 is a perspective view illustrating a multiple cone focusing device operating within the scope of the present invention.

Referring now to FIG. 11, thereshown is yet another alternate embodiment of the focusing device 60 of the present invention. In the focusing device 60 illustrated in FIG. 11, the inlet opening 28 has a pair of side lobes 61, 62. The side lobes 61, 62 cooperate with a center opening 64 to direct the light beams 40 toward the discharge opening 30. Each of the lobes 61, 62 include a tapered inner wall 66, 68 that cooperates with the tapered main wall 70 to direct the inlet laser beam toward the discharge opening 30. Once again, the solid body 18 is preferably formed from a metallic material, such as stainless steel or aluminum, to direct the inlet laser beam toward the outlet opening 30 to define the focused laser beam 16.

Various alternatives and embodiments are contemplated as being within the scope of the following claims particularly pointing out and distinctly claiming the subject matter regarded as the invention.

I claim:

1. An apparatus for focusing an input laser beam, the apparatus comprising:

a solid body extending between an inlet end and a discharge end;

an inlet opening formed in the inlet end of the solid body, the inlet opening defining an entry area greater than the cross-sectional area of the input laser beam such that the entire input laser beam enters the inlet opening;

a discharge opening formed in the discharge end of the solid body, the discharge opening having an exit area less than the cross-sectional area of the input laser beam;

a conical inner wall formed in the solid body to define an open interior, the conical inner wall extending from the inlet opening to the discharge opening, wherein the conical inner wall includes a polished surface that reflects the input laser beam toward the discharge opening; and a heating element positioned in contact with the solid body, wherein the heating element is operable to elevate the temperature of the solid body including the conical inner wall to increase the reflectivity of the conical inner wall.

2. The apparatus of claim 1 wherein the heating element is positioned within the solid body.

3. The apparatus of claim 1 wherein the discharge opening is circular.

4. The apparatus of claim 1 wherein the solid body is formed from a metallic material.

5. The apparatus of claim 1 wherein the conical inner wall is continuously tapered from the inlet opening to the discharge opening.

6. The apparatus of claim 1 wherein the discharge opening includes an outlet stencil defining an outlet shape for the focused laser beam.

7. An apparatus for focusing an input laser beam, the apparatus comprising:

a solid body extending between an inlet end and a discharge end;

an inlet opening formed in the inlet end of the solid body, the inlet opening defining an entry area greater than the cross-sectional area of the input laser beam such that the entire input laser beam enters the inlet opening;

a discharge opening formed in the discharge end of the solid body, the discharge opening having an exit area less than the cross-sectional area of the input laser beam; and a conical inner wall formed in the solid body to define an open interior, the conical inner wall extending from the inlet opening to the discharge opening, wherein the conical inner wall includes a polished surface that reflects the input laser beam toward the discharge opening, wherein the conical inner wall of the solid body includes a plurality of steps, each step decreasing the internal diameter of the open interior from the inlet opening to the discharge opening, wherein the input laser beam is reflected off of the plurality of steps toward the discharge opening.

8. The apparatus of claim 7 further comprising a heating element positioned in contact with the solid body, wherein the heating element is operable to elevate the temperature of the solid body including the conical inner wall to increase the reflexivity of the conical inner wall.

9. The apparatus of claim 8 wherein the heating element is positioned within the solid body.

10. The apparatus of claim 9 wherein each of the steps includes a polished surface.

11. A method of focusing an input laser beam without the use of optics, the method comprising the steps of:

providing a focusing device having a solid body extending between an inlet end and a discharge end;

forming an open interior within the solid body for focusing the input laser beam, the open interior being defined by a conical inner wall extending between an inlet opening formed at the inlet end of the solid body and a discharge opening formed at the discharge end of the solid body;

positioning the focusing device such that the input laser beam is received within the inlet opening, wherein the inlet has an entry area greater than the cross-sectional area of the input laser beam;

discharging a focused laser beam from the discharge opening, wherein the discharge opening defines an exit area that is less than the cross-sectional area of the input laser beam;

positioning a heating element in contact with the solid body; and operating the heating element to elevate the temperature of the solid body including the conical inner wall to increase the reflexivity of the conical inner wall.

12. The method of claim 11 wherein the heating element is positioned within the solid body.

13. The method of claim 11 wherein the conical inner wall is formed from a polished surface that reflects the input laser beam toward the discharge opening.

14. The method of claim 11 further comprising the step of forming the discharge opening in a shape to define the shape of the focused laser beam.

15. A method of focusing an input laser beam without the use of optics, the method comprising the steps of:

providing a focusing device having a solid body extending between an inlet end and a discharge end;

forming an open interior within the solid body for focusing the input laser beam, the open interior being defined by a conical inner wall extending between an inlet opening formed at the inlet end of the solid body and a discharge opening formed at the discharge end of the solid body;

forming a plurality of steps along the conical inner wall, each step decreasing the internal diameter of the open interior from the inlet opening to the discharge opening;

positioning the focusing device such that the input laser beam is received within the inlet opening and reflected off of the plurality of steps formed along the conical inner wall toward the discharge end, wherein the inlet opening has an entry area greater than the cross-sectional area of the input laser beam; and discharging a focused laser beam from the discharge opening, wherein the discharge opening defines an exit area that is less than the cross-sectional area of the input laser beam.

16. The method of claim 15 further comprising the steps of:

positioning a heating element in contact with the solid body; and operating the heating element to elevate the temperature of the solid body including the conical inner wall to increase the reflexivity of the conical inner wall.

* * * * *